(12) United States Patent
Vaish et al.

(10) Patent No.: US 11,935,198 B2
(45) Date of Patent: Mar. 19, 2024

(54) MARKER-BASED VIRTUAL MAILBOX FOR AUGMENTED REALITY EXPERIENCES

(71) Applicant: Snap Inc., Santa Monica, CA (US)

(72) Inventors: Rajan Vaish, Beverly Hills, CA (US); Yu Jiang Tham, Los Angeles, CA (US); Brian Anthony Smith, New York, NY (US); Sven Kratz, Mercer Island, WA (US); Karen Stolzenberg, Venice, CA (US); David Meisenholder, Manhattan Beach, CA (US)

(73) Assignee: Snap Inc., Santa Monica, CA (US)

( * ) Notice: Subject to any disclaimer, the term of this patent is extended or adjusted under 35 U.S.C. 154(b) by 93 days.

(21) Appl. No.: 17/362,431

(22) Filed: Jun. 29, 2021

(65) Prior Publication Data

US 2022/0414989 A1 Dec. 29, 2022

(51) Int. Cl.
*G06T 7/00* (2017.01)
*G06T 13/80* (2011.01)
*G06T 19/00* (2011.01)
*H04L 51/046* (2022.01)
*H04L 51/216* (2022.01)
*H04L 51/222* (2022.01)

(52) U.S. Cl.
CPC ............. *G06T 19/006* (2013.01); *G06T 7/00* (2013.01); *G06T 13/80* (2013.01); *H04L 51/046* (2013.01); *H04L 51/216* (2022.05); *H04L 51/222* (2022.05); *G06T 2207/30204* (2013.01)

(58) Field of Classification Search
CPC . G06T 7/00; G06T 7/70–77; G06T 13/00–80; G06T 19/006; H04L 51/046; H04L 51/216
See application file for complete search history.

(56) References Cited

U.S. PATENT DOCUMENTS

| 10,228,242 | B2 | 3/2019 | Abovitz et al. |
| 10,678,838 | B2 | 6/2020 | Bailey |
| 10,916,065 | B2 | 2/2021 | Furtwangler et al. |
| 11,328,027 | B1* | 5/2022 | Wang ..................... G06V 20/10 |
| 11,430,211 | B1* | 8/2022 | Tiutiunnik .............. H04L 51/10 |

(Continued)

FOREIGN PATENT DOCUMENTS

WO 2019055703 3/2019
WO WO-2023278990 A1 1/2023

OTHER PUBLICATIONS

"International Application Serial No. PCT/US2022/073213, International Search Report dated Oct. 26, 2022", 19 pgs.

(Continued)

*Primary Examiner* — Diane M Wills

(74) *Attorney, Agent, or Firm* — Schwegman Lundberg & Woessner, P.A.

(57) ABSTRACT

A virtual mailbox is established for a first user based on a virtual mailbox definition specified by the first user. A message directed to the first user is received from a first device associated with a second user. A location within a real-world environment of the first user corresponding to the virtual mailbox is identified. A marker associated with the virtual mailbox is detected within the real-world environment of the first user. Based on detecting the marker, the second device presents the message overlaid on the real-world environment at the location corresponding to the virtual mailbox.

20 Claims, 12 Drawing Sheets

(56) References Cited

U.S. PATENT DOCUMENTS

| | | |
|---|---|---|
| 2016/0209658 A1 | 7/2016 | Zalewski |
| 2019/0108578 A1* | 4/2019 | Spivack ................. G09B 5/065 |
| 2020/0209949 A1* | 7/2020 | Noris ................. G06Q 30/0241 |
| 2020/0380486 A1* | 12/2020 | Wright .................... H04L 51/52 |
| 2021/0185475 A1* | 6/2021 | Wang ..................... H04W 4/12 |

OTHER PUBLICATIONS

"International Application Serial No. PCT/US2022/073213, Written Opinion dated Oct. 26, 2022", 4 pgs.

\* cited by examiner

MARKER-BASED VIRTUAL MAILBOX FOR AUGMENTED REALITY EXPERIENCES

TECHNICAL FIELD

The present disclosure generally relates to mobile and wearable computing technology. In particular, example embodiments of the present disclosure address systems, methods, and user interfaces for marker-based virtual mailboxes for augmented reality experiences.

BACKGROUND

Many wearable and mobile devices such as "smart" glasses include an embedded camera. Users of these devices often stream video produced by an embedded camera to other users' devices using mobile device software applications and online platforms.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Figure 1:
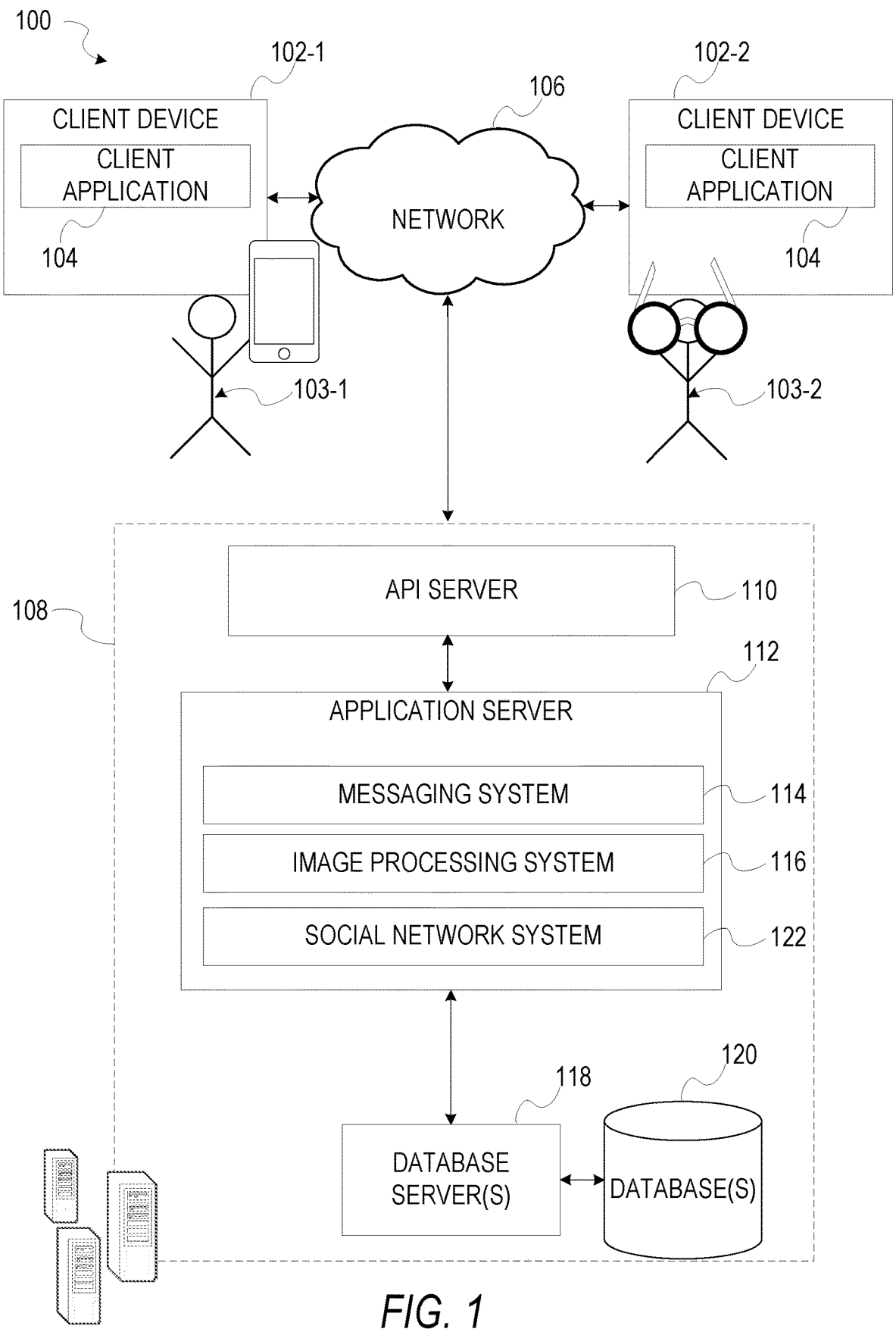
FIG. 1 is a diagrammatic representation of a networked environment in which a communication system that facilitates communication between users using marker-based virtual mailboxes may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

An augmented reality (AR) experience includes application of virtual content to a real-world environment whether through presentation of the virtual content by transparent displays through which a real-world environment is visible or through augmenting image data to include the virtual content overlaid on real-world environments depicted therein. The virtual content can comprise one or more AR content items. An AR content item may include audio content, visual content or a visual effect. A device that supports AR experiences in any one of these approaches is referred to herein as an "AR device."

Organizing incoming messages on a head-worn or other wearable AR devices using traditional 2D interfaces can be cumbersome due limited field of view and input options. Aspects of the present disclosure include systems, methods, techniques, instruction sequences, and computing machine program products system to address the deficiencies of such traditional user interfaces by allowing users to utilize certain fixed points within their real-world environment as receptacles for messages sent from other users. These receptacles are referred to herein as "virtual mailboxes."

Each virtual mailbox is associated with a spatially-tracked marker in the real-world environment of the user. Detecting of a marker within the real-world environment can trigger presentation of messaging related virtual content by the AR device as part of an AR experience that facilities communication between users. For example, visual representations of the virtual mailbox, message feeds, message previews, and messages can be presented to a user by an AR device overlaid on the real-world environment of the user at a location corresponding to a detected marker. In addition, context given by a marker's properties can be used by the user to customize the reception of messages at the corresponding virtual mailbox.

Allowing users to establish virtual mailboxes in this manner improves the user experience as it leverages the user's spatial memory of familiar locations, and unburdens the design of the AR devices user interface, in effect increasing and better organizing the interaction space provided by the user interface of the AR device. Use of spatially-tracked markers makes receiving any type of message on an AR device simpler, more customizable and more effective by moving certain user interface components from a "device-centric" context to a "world-centric" context. This technique improves the user interface organization by leveraging a user's spatial memory, and also expands the "interactive space" available to messaging applications on AR devices. Further, allowing recipients of messages to set up the mailboxes takes the guess work out of the process of senders while enabling the recipients to control when and where they receive messages.

FIG. 1 is a block diagram showing an example communication system 100 for exchanging data (e.g., messages and associated content) over a network. The communication system 100 includes multiple instances of a client device—102-1 and 102-2. Each instance of the client device hosts a number of applications including a communication client application 104. Each communication client application 104 is communicatively coupled to other instances of the communication client application 104 and a communication server system 108 via a network 106 (e.g., the Internet). In an example, the client device 102-2 is a wearable device (e.g., smart glasses) worn by the user 103-2 that includes a camera and optical elements that include a transparent display through which the real-world environment is visible to the user 103-2.

A communication client application 104 is able to communicate and exchange data with another communication client application 104 and with the communication server system 108 via the network 106. The data exchanged between communication client application 104, and between a communication client application 104 and the communication server system 108, includes functions (e.g., commands to invoke functions) as well as payload data (e.g., text, audio, video or other multimedia data).

The communication server system 108 provides server-side functionality via the network 106 to a particular communication client application 104. While certain functions of the communication system 100 are described herein as being performed by either a communication client application 104 or by the communication server system 108, the location of certain functionality either within the communication client application 104 or the communication server system 108 is a design choice. For example, it may be technically preferable to initially deploy certain technology and functionality within the communication server system 108, but to later migrate this technology and functionality to the communication client application 104 where the client device (102-1 or 102-2) has a sufficient processing capacity.

The communication server system 108 supports various services and operations that are provided to the communication client application 104. Such operations include transmitting data to, receiving data from, and processing data generated by the communication client application 104. This data may include, message content, Client Device information, geolocation information, media annotation and overlays, message content persistence conditions, social network information, and live event information, as examples. Data exchanges within the communication system 100 are invoked and controlled through functions available via user interfaces (UIs) of the communication client application 104.

Turning now specifically to the communication server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between instances of the client device (102-1 and 102-2) and the application server 112. Specifically, the Application Program Interface (API) server 110 provides a set of interfaces (e.g., routines and protocols) that can be called or queried by the communication client application 104 in order to invoke functionality of the application server 112. The Application Program Interface (API) server 110 exposes various functions supported by the application server 112, including account registration, login functionality, the sending of messages, via the application server 112, from a particular communication client application 104 to another communication client application 104, the sending of media files (e.g., images or video) from a communication client application 104 to the messaging system 114, and for possible access by another communication client application 104, the setting of a collection of media data (e.g., story), the retrieval of a list of friends of a user of a client device (102-1 or 102-2), the retrieval of such collections, the retrieval of messages and content, the adding and deletion of friends to a social graph, the location of friends within a social graph, and opening an application event (e.g., relating to the communication client application 104).

The application server 112 hosts a number of applications and subsystems, including a messaging system 114, an image processing system 116 and a social network system 122. The messaging system 114 implements a number of message processing technologies and functions, particularly related to the aggregation and other processing of content (e.g., textual and multimedia content) included in messages received from multiple instances of the communication client application 104. As will be described in further detail, the text and media content from multiple sources may be aggregated into collections of content (e.g., called stories or galleries). These collections are then made available, by the messaging system 114, to the communication client application 104. Other processor and memory intensive processing of data may also be performed server-side by the messaging system 114, in view of the hardware requirements for such processing.

The application server 112 also includes an image processing system 116 that is dedicated to performing various image processing operations, typically with respect to images or video generated and displayed by instances of the client device (102-1 and 102-2).

The social network system 122 supports various social networking functions services, and makes these functions and services available to the messaging system 114. To this end, the social network system 122 maintains and accesses an entity graph within the database 120. Examples of functions and services supported by the social network system 122 include the identification of other users of the communication system 100 with which a particular user has relationships or is "following", and also the identification of other entities and interests of a particular user.

The application server 112 is communicatively coupled to a database server 118, which facilitates access to a database 120 in which is stored data associated with messages processed by the messaging system 114.

Figure 2:
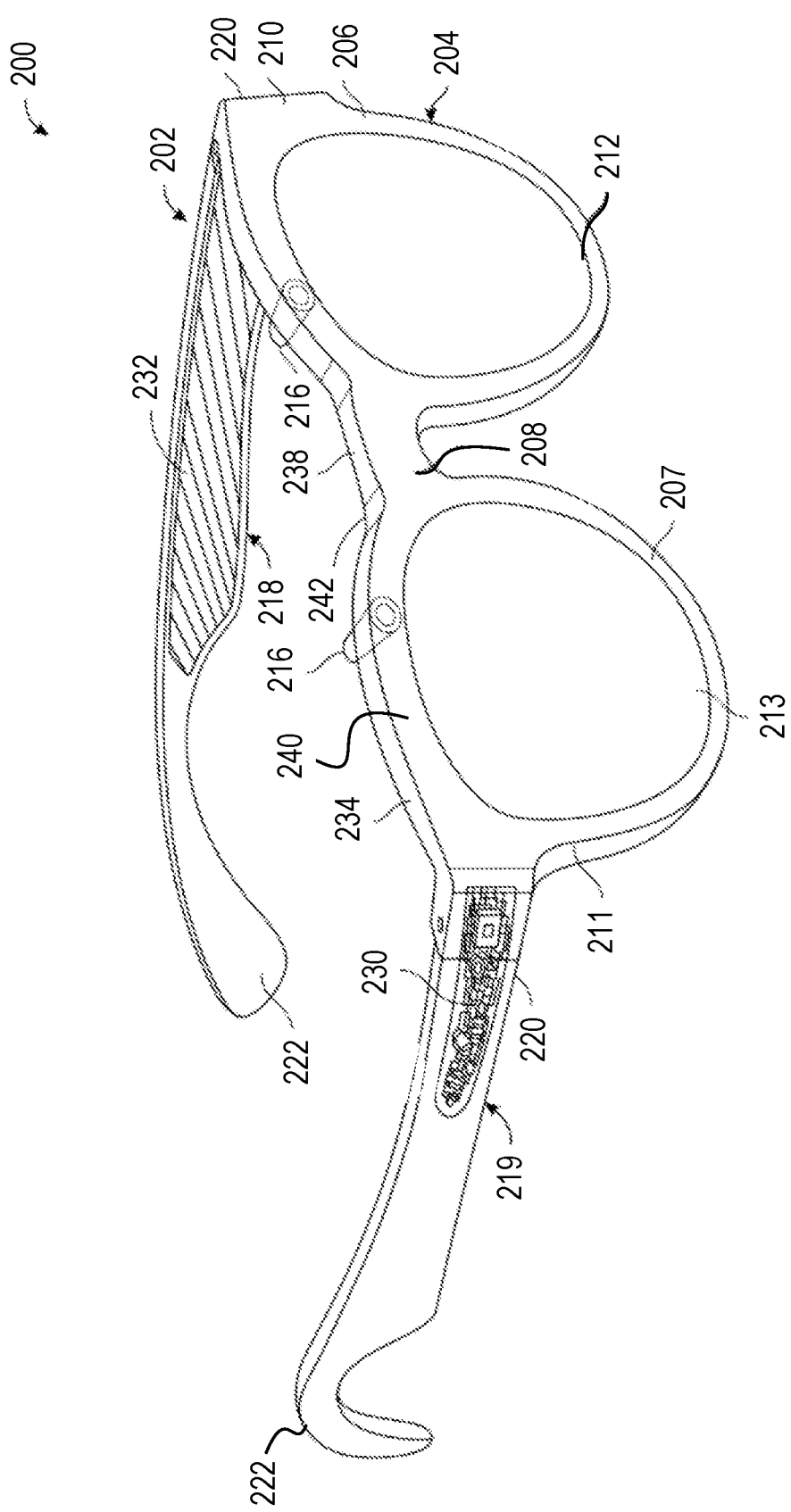
FIG. 2 is a diagram illustrating a wearable device, which may form part of the communication system, according to some example embodiments.

FIG. 2 is a diagram illustrating a wearable device in the example form of glasses 231 for use in an real-time communication session, according to some example embodiments. The glasses 231 can include a frame 232 made from any suitable material such as plastic or metal, including any suitable shape memory alloy. The frame 232 can have a front piece 233 that can include a first or left lens, display, or optical element holder 236 and a second or right lens, display, or optical element holder 237 connected by a bridge 238. The front piece 233 additionally includes a left end portion 241 and a right end portion 242. A first or left optical element 244 and a second or right optical element 243 can be provided within respective left and right optical element holders 236, 237. Each of the optical elements 243, 244 can be a lens, a display (e.g., a transparent display), a display assembly, or a combination of the foregoing. In some embodiments, for example, the glasses 231 are provided with an integrated near-eye display mechanism that enables, for example, display to the user of preview images for visual media captured by cameras 267 of the glasses 231. In some embodiments, integrated near-eye display mechanism allows for display of an AR content item such that the AR content item is overlaid on a real-world environment that is viewable through the optical elements 243 and 244.

The frame 232 additionally includes a left arm or temple piece 246 and a right arm or temple piece 247 coupled to the respective left and right end portions 241, 242 of the front piece 233 by any suitable means, such as a hinge (not shown), so as to be coupled to the front piece 233, or rigidly or fixably secured to the front piece 233 so as to be integral with the front piece 233. Each of the temple pieces 246 and 247 can include a first portion 251 that is coupled to the respective end portion 241 or 242 of the front piece 233 and any suitable second portion 252, such as a curved or arcuate piece, for coupling to the ear of the user. In one embodiment, the front piece 233 can be formed from a single piece of material, so as to have a unitary or integral construction. In one embodiment, the entire frame 232 can be formed from a single piece of material so as to have a unitary or integral construction.

The glasses 231 can include a device, such as a computer 261, which can be of any suitable type so as to be carried by the frame 232 and, in one embodiment, of a suitable size and shape so as to be at least partially disposed in one of the temple pieces 246 and 247. In one embodiment, the computer 261 has a size and shape similar to the size and shape of one of the temple pieces 246, 247 and is thus disposed almost entirely if not entirely within the structure and confines of such temple pieces 246 and 247. In one embodiment, the computer 261 can be disposed in both of the temple pieces 246, 247. The computer 261 can include one or more processors with memory, wireless communication circuitry, and a power source. The computer 261 comprises low-power circuitry, high-speed circuitry, and a display processor. Various other embodiments may include these elements in different configurations or integrated together in different ways.

The computer 261 additionally includes a battery 262 or other suitable portable power supply. In one embodiment, the battery 262 is disposed in one of the temple pieces 246 or 247. In the glasses 231 shown in FIG. 2, the battery 262 is shown as being disposed in the left temple piece 246 and electrically coupled using a connection 274 to the remainder of the computer 261 disposed in the right temple piece 247. One or more I/O devices can include a connector or port (not shown) suitable for charging a battery 262 accessible from the outside of the frame 232, a wireless receiver, transmitter, or transceiver (not shown), or a combination of such devices. Given the limited size of the glasses 231 and the computer 261, resource-intensive operations such as video streaming can quickly drain the battery 262 and can be a strain on the one or more processors of the computer 261 that can lead to overheating.

The glasses 231 include digital cameras 267. Although two cameras 267 are depicted, other embodiments contemplate the use of a single or additional (i.e., more than two) cameras. For ease of description, various features relating to the cameras 267 will further be described with reference to only a single camera 267, but it will be appreciated that these features can apply, in suitable embodiments, to both cameras 267.

Consistent with some embodiments, the glasses 231 are an example instance of the client device 102-2 and may be worn by the user 103-1. Further, in these embodiments, the user 103-2 can view a live camera feed generated by the camera 267 and interact with the user 103-2 by causing virtual content to be added to a real-world environment that is visible to the user 103-1 via the glasses 231. That is, one or more AR content items corresponding to virtual content selected by the user 103-2 can be displayed by the integrated near-eye display mechanism that enables such that the AR content item is overlaid on a real-world environment that is viewable through the optical elements 243 and 244.

In various embodiments, the glasses 231 may include any number of input sensors or peripheral devices in addition to the cameras 267. The front piece 233 is provided with an outward-facing, forward-facing, front, or outer surface 266 that faces forward or away from the user when the glasses 231 are mounted on the face of the user, and an opposite inward-facing, rearward-facing, rear, or inner surface 269 that faces the face of the user (e.g., user 103-1) when the glasses 231 are mounted on the face of the user. Such sensors can include inward-facing video sensors or digital imaging modules such as cameras that can be mounted on or provided within the inner surface 269 of the front piece 233 or elsewhere on the frame 232 so as to be facing the user, and outward-facing video sensors or digital imaging modules such as the cameras 267 that can be mounted on or provided with the outer surface 266 of the front piece 233 or elsewhere on the frame 232 so as to be facing away from the user. Such sensors, peripheral devices, or peripherals can additionally include biometric sensors, location sensors, accelerometers, or any other such sensors.

The glasses 231 further include an example embodiment of a camera control mechanism or user input mechanism comprising a camera control button mounted on the frame 232 for haptic or manual engagement by the user. The camera control button provides a bi-modal or single-action mechanism in that it is disposable by the user between only two conditions, namely an engaged condition and a disengaged condition. In this example embodiment, the camera control button is a pushbutton that is by default in the disengaged condition, being depressible by the user to dispose it to the engaged condition. Upon release of the depressed camera control button, it automatically returns to the disengaged condition.

In other embodiments, the single-action input mechanism can instead be provided by, for example, a touch-sensitive button comprising a capacitive sensor mounted on the frame 232 adjacent to its surface for detecting the presence of a user's finger to dispose the touch-sensitive button to the engaged condition when the user touches a finger to the corresponding spot on the outer surface of the frame 232. It will be appreciated that the above-described camera control button and capacitive touch button are but two examples of a haptic input mechanism for single-action control of the camera 267 and that other embodiments may employ different single-action haptic control arrangements.

Figure 3:
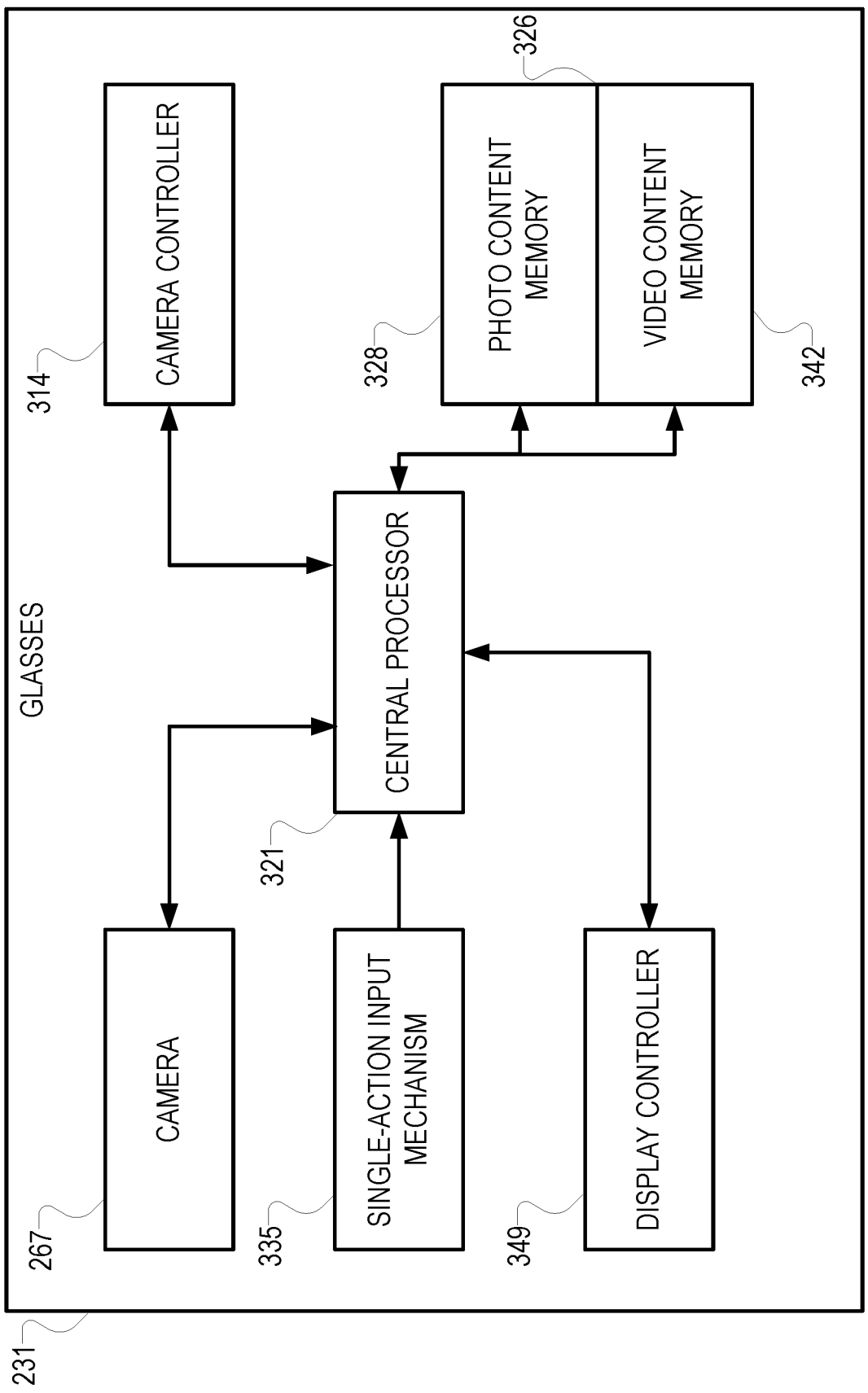
FIG. 3 is a block diagram illustrating aspects of the wearable device, according to some example embodiments.

FIG. 3 is a block diagram illustrating aspects of the wearable device in the example form of the glasses 231, according to some example embodiments. The computer 261 of the glasses 231 includes a central processor 321 in communication with an onboard memory 326. The central processor 321 may be a CPU and/or a graphics processing unit (GPU). The memory 326 in this example embodiment comprises a combination of flash memory and random-access memory.

The glasses 231 further include a camera controller 314 in communication with the central processor 321 and the camera 267. The camera controller 314 comprises circuitry configured to control recording of either photographic content or video content based upon processing of control signals received from the single-action input mechanism that includes the camera control button, and to provide for automatic adjustment of one or more image-capture parameters pertaining to capturing of image data by the camera 267 and on-board processing of the image data prior to persistent storage thereof and/or to presentation thereof to the user for viewing or previewing.

In some embodiments, the camera controller 314 comprises permanently configured circuitry, such as firmware or an application-specific integrated circuit (ASIC) configured to perform the various functions described herein. In other embodiments, the camera controller 314 may comprise a dynamically reconfigurable processor executing instructions that temporarily configure the processor to execute the various functions described herein.

The camera controller 314 interacts with the memory 326 to store, organize, and present image content in the form of photo content and video content. To this end, the memory 326 in this example embodiment comprises a photo content memory 328 and a video content memory 342. The camera controller 314 is thus, in cooperation with the central processor 321, configured to receive from the camera 267 image data representative of digital images produced by the camera 267 in accordance with some of the image-capture parameters, to process the image data in accordance with some of the image-capture parameters, and to store the processed image data in an appropriate one of the photo content memory 328 and the video content memory 342.

The camera controller 314 is further configured to cooperate with a display controller 349 to cause display on a display mechanism incorporated in the glasses 231 of selected photos and videos in the memory 326 and thus to provide previews of captured photos and videos. In some embodiments, the camera controller 314 will manage processing of images captured using automatic bracketing parameters for inclusion in a video file.

A single-action input mechanism 335 is communicatively coupled to the central processor 321 and the camera controller 314 to communicate signals representative of a current state of the camera control button and thereby to communicate to the camera controller 314 whether or not the camera control button is currently being pressed. The camera controller 314 further communicates with the central processor 321 regarding the input signals received from the single-action input mechanism 335. In one embodiment, the camera controller 314 is configured to process input signals received via the single-action input mechanism 335 to determine whether a particular user engagement with the camera control button is to result in a recording of video content or photographic content and/or to dynamically adjust one or more image-capture parameters based on processing of the input signals. For example, pressing of the camera control button for longer than a predefined threshold duration causes the camera controller 314 automatically to apply relatively less rigorous video processing to captured video content prior to persistent storage and display thereof. Conversely, pressing of the camera control button for shorter than the threshold duration in such an embodiment causes the camera controller 314 automatically to apply relatively more rigorous photo stabilization processing to image data representative of one or more still images.

The glasses 231 may be a stand-alone client device that is capable of independent operation or may be a companion device that works with a primary device to offload intensive processing and/or exchange data over the network 106 with the communication server system 108. The glasses 231 may further include various components common to mobile electronic devices such as smart glasses or smart phones (for example, including a display controller for controlling display of visual media (including photographic and video content captured by the camera 267) on a display mechanism incorporated in the device). Note that the schematic diagram of FIG. 3 is not an exhaustive representation of all components forming part of the glasses 231.

Figure 4:
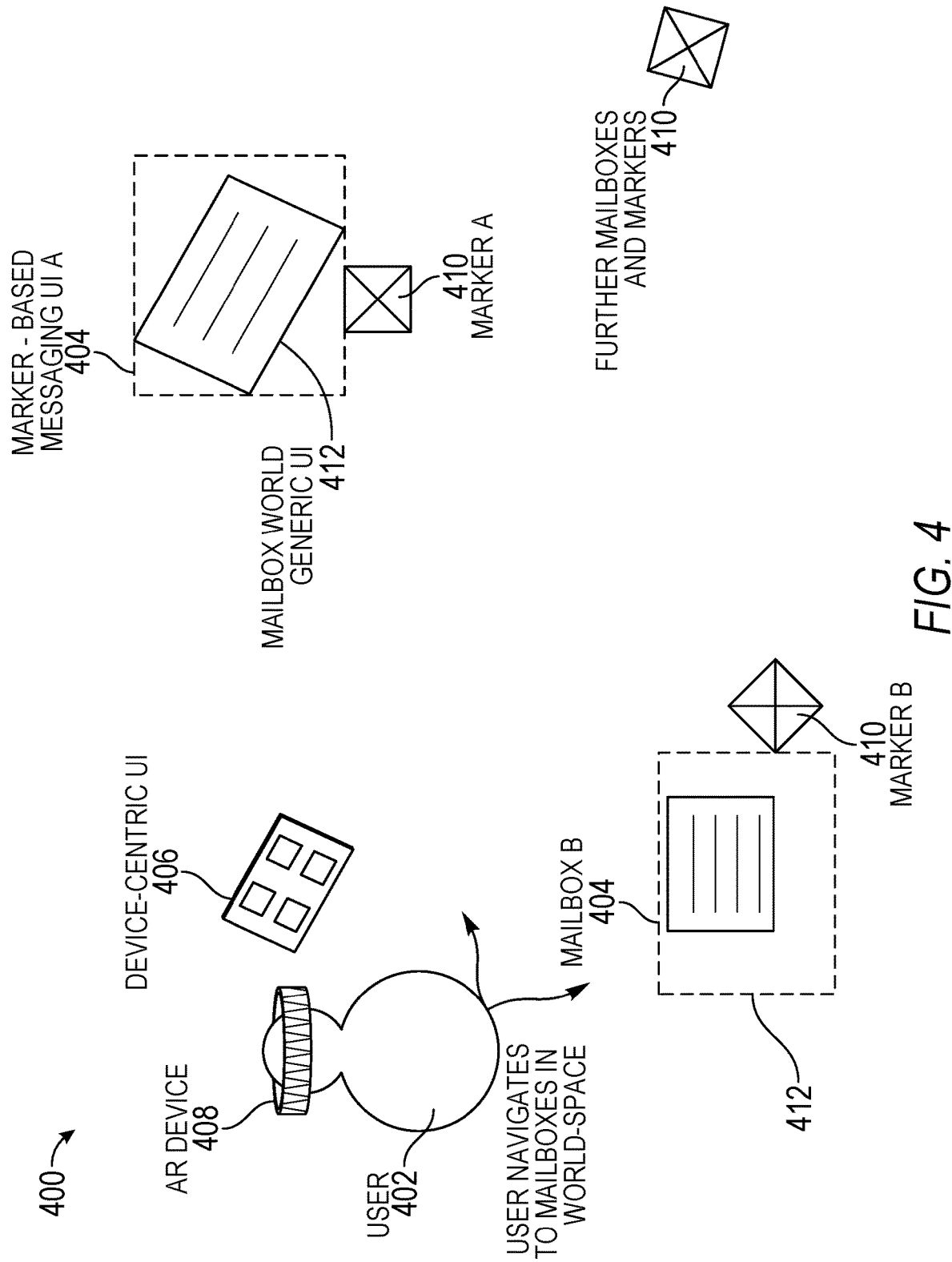
FIG. 4 is a conceptual diagram illustrating aspects of the communication system, according to example embodiments.

FIG. 4 is a conceptual diagram illustrating aspects of the communication system 100 in facilitating communication between users using marker-based virtual mailboxes, according to example embodiments. As noted above, AR experiences include application of virtual content to real-world environments whether through presentation of the virtual content by transparent displays through which a real-world environment is visible or through augmenting image data to include the virtual content overlaid on real-world environments depicted therein. The virtual content may comprise one or more AR content items. An AR content item may include audio content, visual content or a visual effect. Examples of audio and visual content include pictures, texts, logos, animations, and sound effects. The audio and visual content or the visual effects can be applied to media data such as a live image stream.

Data and various systems using AR content items or other such transform systems to modify content using this data can involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Compared to traditional screen-based devices, AR devices allow users to leverage the space around them as part of a UI. The communication system 100 utilizes this aspect of AR devices to provide an improved message mailbox UI compared to traditional message mailboxes on 2D desktop or phone-based UIs. Leveraging the spatial perception capabilities of AR devices, the communication system 100 allows a user to predefine certain locations in their real-world environment as endpoints for receiving messages from other users of a communication system. These endpoints are referred to herein as "virtual mailboxes."

As shown in FIG. 4, within a real-world environment 400, a user 402 (e.g., user 103-1 or 103-2) can create multiple virtual mailboxes 404. The user 402 can create the virtual mailboxes 404 using a mailbox creation UI subcomponent 406 of a user interface presented by an AR device 408. As will be discussed in further detail below, the mailbox creation UI subcomponent 406 allows the user 402 to define properties of a virtual mailbox 404. As an example, each virtual mailbox 404 can be associated with a marker 410 in the real-world environment 400 based on input supplied by the user to the mailbox creation UI subcomponent 406. A marker 410 can be a visual or non-visual marker.

As the user 402 navigates through the real-world environment 400, various virtual content can be presented to the user 402 via the AR device 408 as part of an AR experience to facilitate the exchange of messages between users. For example, the AR device 408 can present visual representations of the virtual mailboxes 404, indications of received messages, previews of messages, and messages as overlays on the real-world environment 400. In some instances, such visual content can be presented based on detecting a corresponding marker 410 in the real-world environment 400. Indications of messages being received, previews of messages, and messages as overlays on the real-world environment 400 can be presented by a message display and preview UI subcomponent 412 presented via the AR device 408.

In general, the virtual mailboxes 404 make it easier for the user 402 to organize both reception and receiving messages on their device (e.g., the glasses 231), overcoming some of the limitations found on of traditional message mailboxes and the devices on which they are displayed. As an example, virtual mailboxes 404 address view limitations that occur on many traditional devices, in which the field of view (FOV) is constrained compared to normal human FOV (e.g., usually 60-90 degrees vs. 210 degrees of normal human binocular FOV). By spatializing virtual mailboxes and displaying messages at their locations, users are enabled to leverage "in-the-world" spatial knowledge as part of the UI of the AR device 408.

As another example, the virtual mailboxes 404 address limitations related to in-the-world vs. on-device interactions. Using spatial fixed points in an AR experience expands the interactivity of the AR experience supported by the AR device 408. Instead of exploring a purely virtual UI, placing interactive components such as virtual mailboxes 404 into the world greatly expands the interactivity of an AR experience.

As yet another example, the virtual mailboxes 404 can improve usability and user experiences compared to traditional message mailbox interfaces. Placing virtual mailboxes 404 at fixed locations in the real-world environment 400 can be beneficial in terms of ease of navigation to the virtual mailboxes and the choice of visual representation of the mailbox (e.g., through a fiducial marker, representative image or a particular object that can be scanned and recognized by the AR device). At least in view of these examples, it shall be appreciated that the virtual mailboxes described herein offer the recipient of messages greater control than is provided by conventional mailboxes. These virtual mailboxes allow users to experience communication when and where they want, and not be distracted by anytime/anywhere messages.

Figure 5:
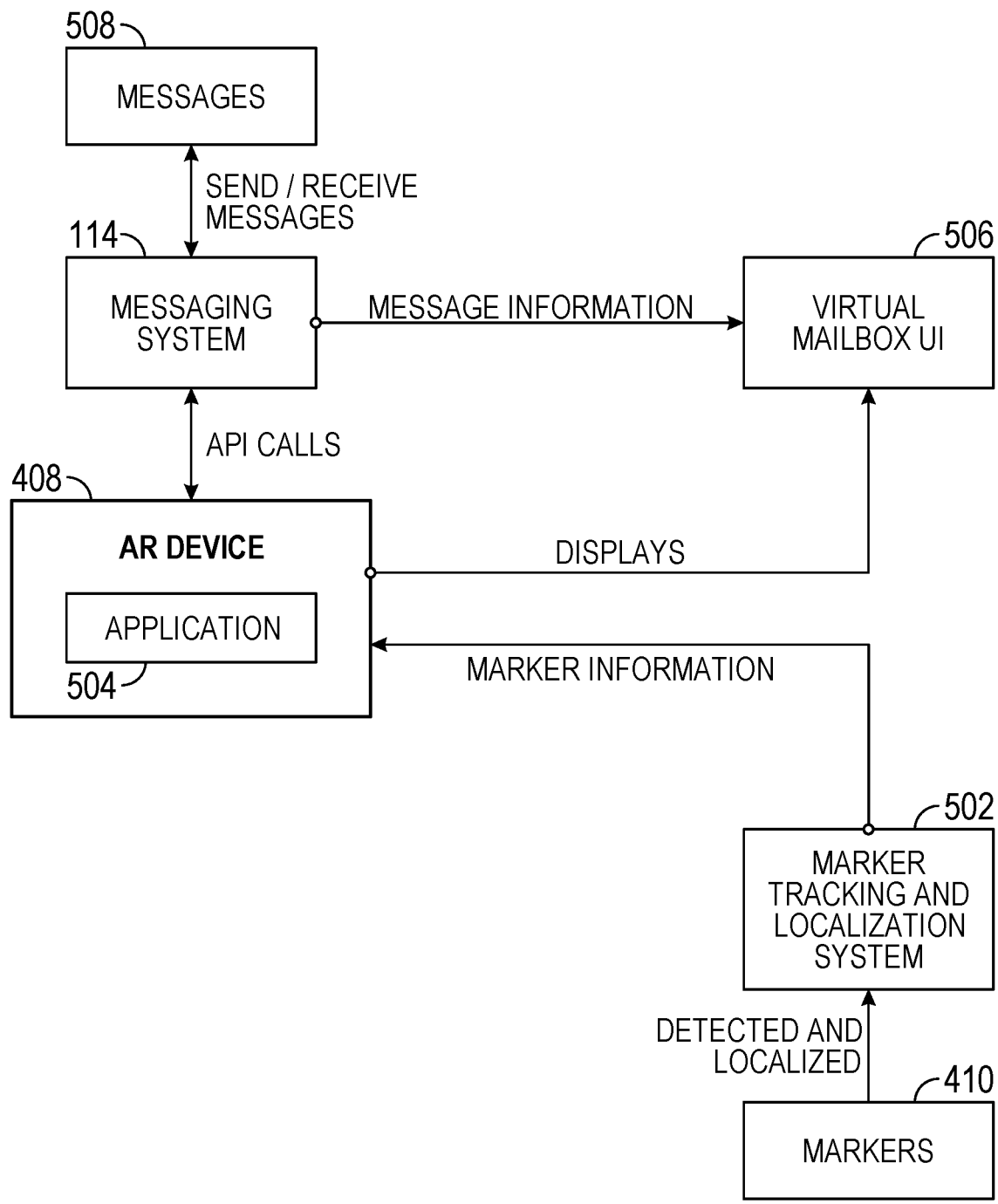
FIG. 5 is a block diagram illustrating components of the communication system that facilitate communication between users using marker-based virtual mailboxes, according to example embodiments.

FIG. 5 is a block diagram illustrating components of the communication system that facilitate communication between users using marker-based virtual mailboxes, according to example embodiments. The communication system 100 embodies a number of subsystems, which are supported on the client-side by the communication client application 104 and on the sever-side by the application servers 112. These subsystems include, for example, the messaging system 114 and a marker tracking and localization system 502.

As discussed above, the AR device 408 is a device that supports AR experiences (also referred to herein as a "AR device"). The AR device 408 can be a wearable device such as the glasses 231 or a mobile computing device such as a smart phone or tablet. In the example illustrated in FIG. 5, the AR device 408 corresponds to the client device 102-2.

The AR device 408 executes an application 504 (e.g., the communication client application 104) or other system software (e.g., an operation system (OS)) that executes processes to support AR experiences and facilitate communication between the messaging system 114, the marker tracking and localization system 502 and a virtual mailbox UI 506.

Generally, the communication system 100 supports the delivery and display of messages 508 originating from the messaging system 114. The communication system 100 allows sending messages 508 between users of AR devices as well as devices that do not support AR experiences. Notably, the messaging system 114 supports presentation of virtual content that is typically provided in an AR experience, such as 3D graphics, animations, virtual avatars, world overlays and filters, as well as other types content that can be delivered on devices that do not support AR experiences.

The marker tracking and localization system 502 provides a mechanism by which the AR device 408 can localize a certain location in the real-world environment of the user of the AR device 408 (e.g., a location of an object or picture within the real-world environment). To this end, the marker tracking and localization system 502 can utilize one or more of the following known methods for tracking and localization: visual fiducial codes, image tracking, 3D object detection, Bluetooth or Bluetooth Low-Energy Beacons and near field communication (NFC), sonic and ultrasonic beacons, and IR light beacons. In general, the marker tracking and localization system 502 serves as the technical mechanism to anchor virtual mailboxes at certain location in the real-world environment of the user.

The marker tracking and localization system 502 detects markers 410 in the real-world environment of the user. As noted above, a marker 410 can be a visual or non-visual marker. Non-limiting examples of non-visual markers include temperature, noise-level, time, and location along with any signal that can be sensed by a computing device. Certain types of markers 410 (e.g., images or beacons) can be moved within the real-world environment by the user. In these instances, the device 408 detects the marker 410 and uses an additional localization technique (e.g., simultaneous localization and mapping (SLAM)) to pinpoint an exact location of the marker in the environment.

The virtual mailbox UI 408 provides functionality to allow a user to defined virtual mailboxes as well as send and receive messages 508 to and from a virtual mailbox. To this end, the virtual mailbox UI 506 comprises the mailbox creation UI subcomponent 406 and the message display and preview UI subcomponent 412 mentioned above.

The virtual mailbox creation UI subcomponent 406 allows the user to define one or more mailboxes at spatial or marker-based locations in the environment around them. A specific location and/or spatial marker is recorded by the AR device 408 and associated with a particular virtual mailbox 404. As noted above, a marker 410 can be any trackable artifact present in the real-world environment of the user.

A virtual mailbox definition is generated based on user input provided to the virtual mailbox creation UI subcomponent 406. The virtual mailbox definition specifies one or more properties of a virtual mailbox 404. A virtual mailbox definition can, for example, specify: that a virtual mailbox can only receive messages from certain users or certain user groups; that a virtual mailbox can only receive messages with certain types of content; contextual conditions that control when a virtual mailbox is active (e.g., specific day or time of day, user's presence state (e.g., "online", "away" or "do not disturb") or the presence certain applications running in the foreground of the AR device 408); that a virtual mailbox is to be present at a certain location in the real-world environment in order to receive messages (thereby allowing the user to manually enable/disable the mailbox by simply moving the marker to a different location); or whether a virtual mailbox is designated for sending or receiving messages.

Figure 6:
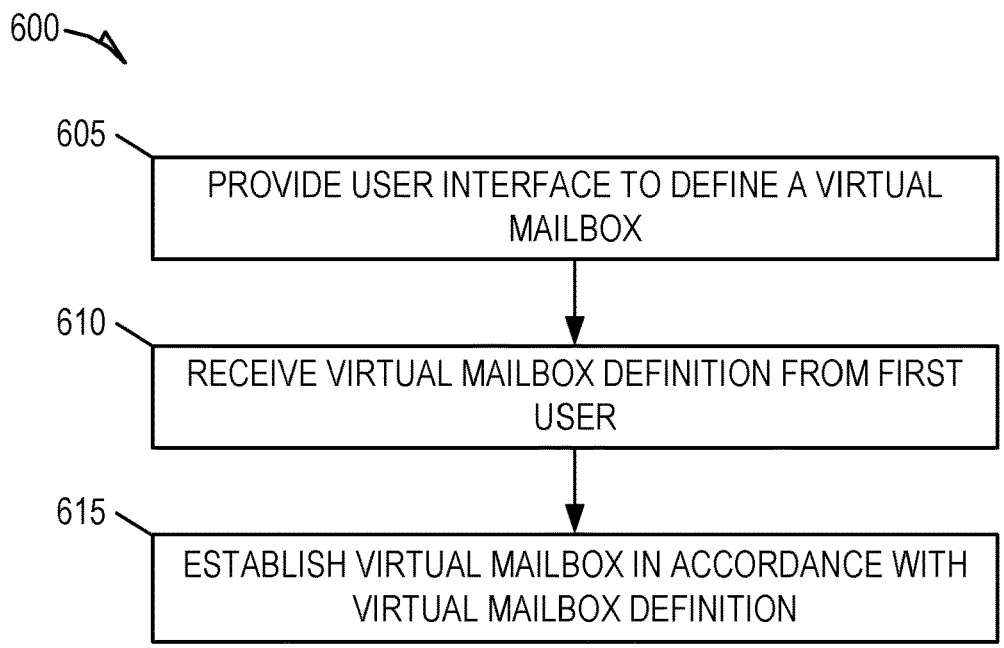
FIGS. 6 and 7 are flowcharts illustrating operations of the communication system in performing a method for creating and updating a virtual mailbox, according to example embodiments.
Figure 7:
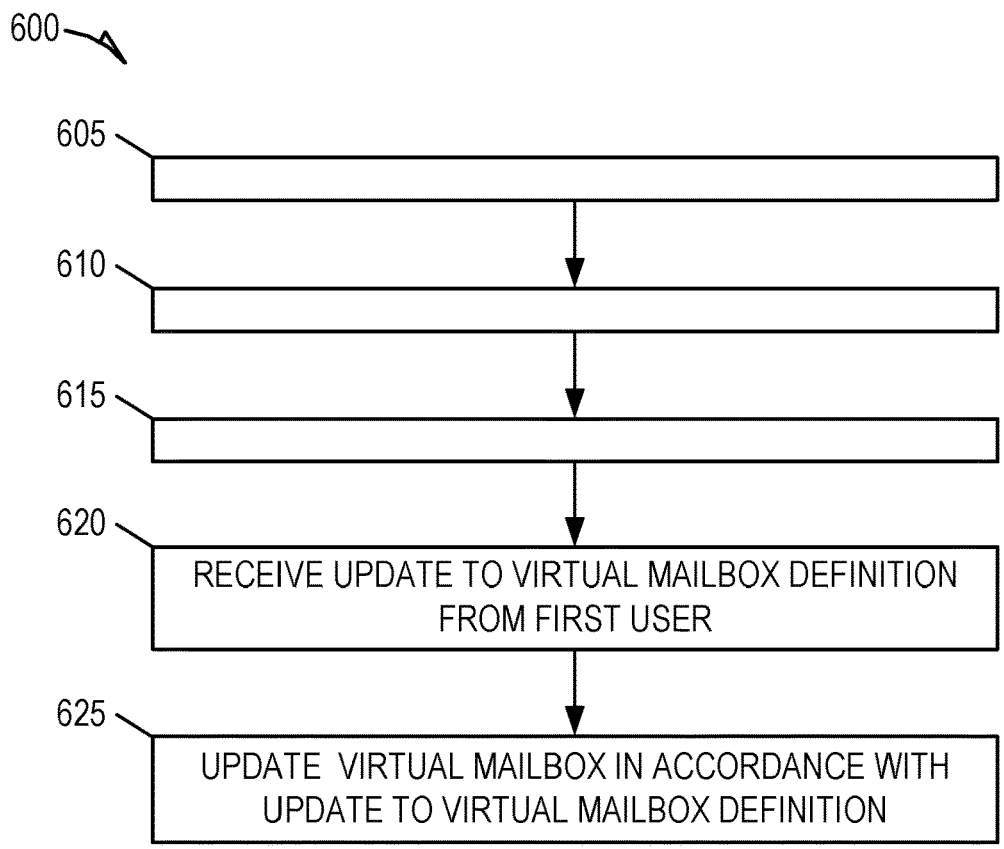

FIGS. 6 and 7 are flowcharts illustrating operations of the communication system in performing a method 600 for creating and updating a virtual mailbox, according to example embodiments. The method 600 may be embodied in computer-readable instructions for execution by one or more processors such that the operations of the method 600 may be performed in part or in whole by the functional components of the communication system 100; accordingly, the method 600 is described below by way of example with reference thereto. However, it shall be appreciated that at least some of the operations of the method 600 may be deployed on various other hardware configurations than the communication system 100.

At operation 605, the communication system 100 provides, to a device (e.g., client device 102-2), a user interface for defining a virtual mailbox for a user (e.g., user 103-2) of the device. The user interface comprises one or more elements for specifying properties of the virtual mailbox, which collectively correspond to a virtual mailbox definition. Accordingly, the user interface may include a combination of input fields, toggles, and other user interface input elements that can be used to specify the properties of the virtual mailbox.

At operation 610, the communication system 100 receives a virtual mailbox definition based on input received from the user via the user interface. The virtual mailbox definition specifies one or more properties of the virtual mailbox. For example, the virtual mailbox definition can specify a location of the virtual mailbox, a visual representation of the virtual mailbox, a marker associated with the virtual mailbox, an amount of time messages persists at the mark, and one or more constraints on messages received at the virtual mailbox. The one or more constraints can, for example, specify users or other entities whose messages are to be directed to the virtual mailbox, a subject matter of messages to be directed to the virtual mailbox, or other such constraints. The virtual mailbox definition can further specify whether the virtual mailbox is designated as an out-bound mailbox for sending messages, an in-bound mailbox for receiving messages, or both.

At operation 615, the communication system 100 establishes the virtual mailbox in accordance with the virtual mailbox definition. In establishing the virtual mailbox, the communication system 100 generates a record of the virtual mailbox in a database for tracking virtual mailboxes. The record includes an indication of the one or more properties specified in the virtual mailbox definition such as the location of the virtual mailbox, the visual representation of the virtual mailbox, the marker associated with the virtual mailbox, and one or more constraints on messages received at the virtual mailbox.

In establishing the virtual mailbox, the communication system 100 may cause the device to display the visual representation of the virtual mailbox overlaid on a real-world environment of the user at the location specified in the virtual mailbox definition. In an example, the device may be a wearable device (e.g., glasses 231) worn by the user that includes a transparent display through which the user can view the surrounding environment. The communication system 100 may cause the transparent display to present the visual representation of the virtual mailbox such that the visual representation is overlaid on the real-world environment as if it were physically present in the real-world environment.

Figure 9:
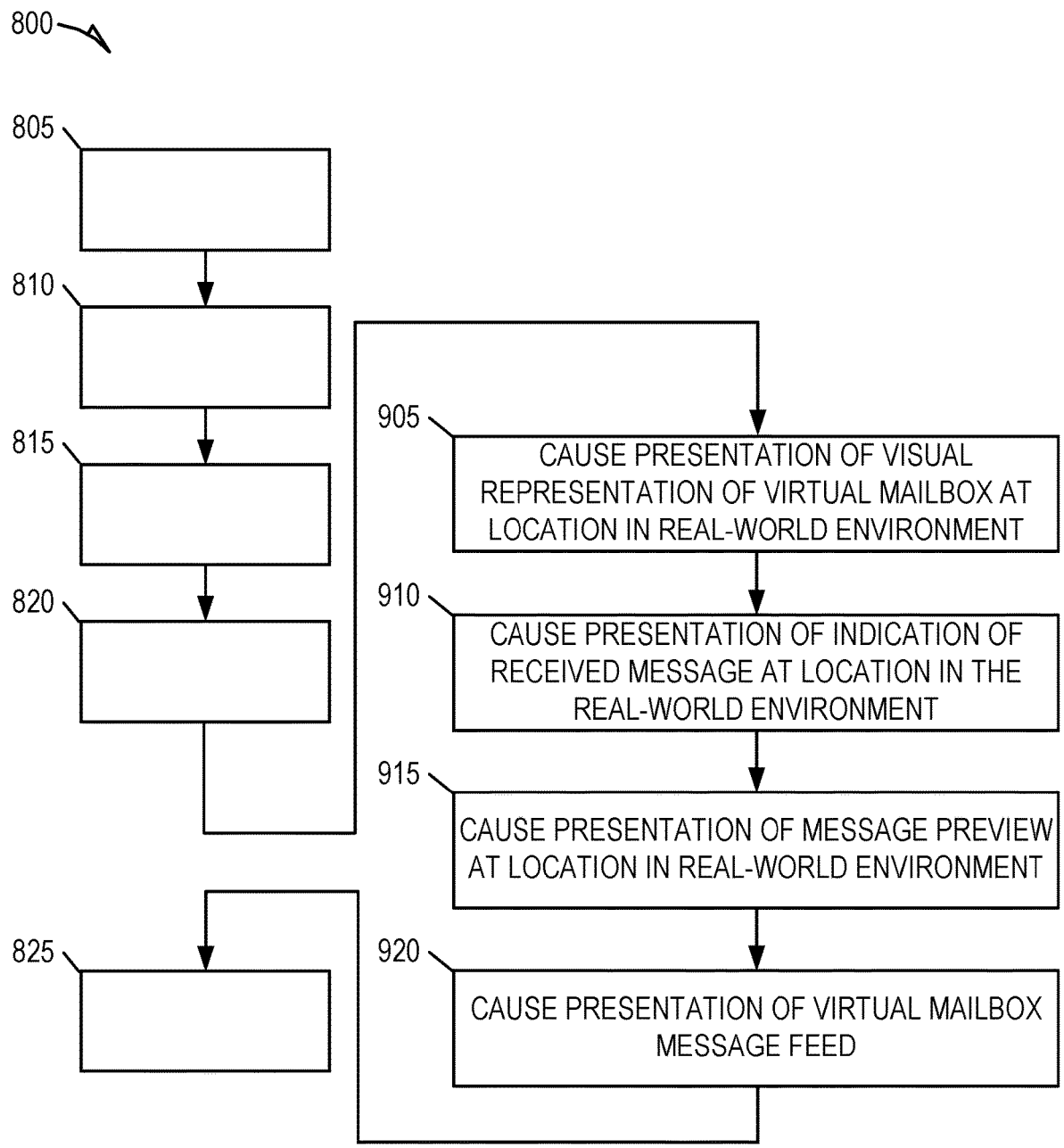

As shown in FIG. 9, the method 600 can further include operations 620 and 625, consistent with some embodiments. At operation 620, the communication system 100 receives input entered via the user interface. The input comprises an update to the virtual mailbox definition. The communication system 100 updates the virtual mailbox based on the update to the virtual mailbox definition, at operation 625.

The update to the virtual mailbox definition can, for example, include one or more of a new location for the virtual mailbox, an updated visual representation of the virtual mailbox, and an update to the one or more constraints (e.g., an addition of a constraint, a removal of a constraint, or a change to an existing constraint). Accordingly, the updating of the virtual mailbox can include one or more of: changing the location of the virtual mailbox, changing the visual representation of the virtual mailbox, and changing one or more constraints on messages received at the virtual mailbox. The communication system 100 may further update the record of the virtual mailbox in the database to reflect the update to the virtual mailbox definition.

Figure 8:
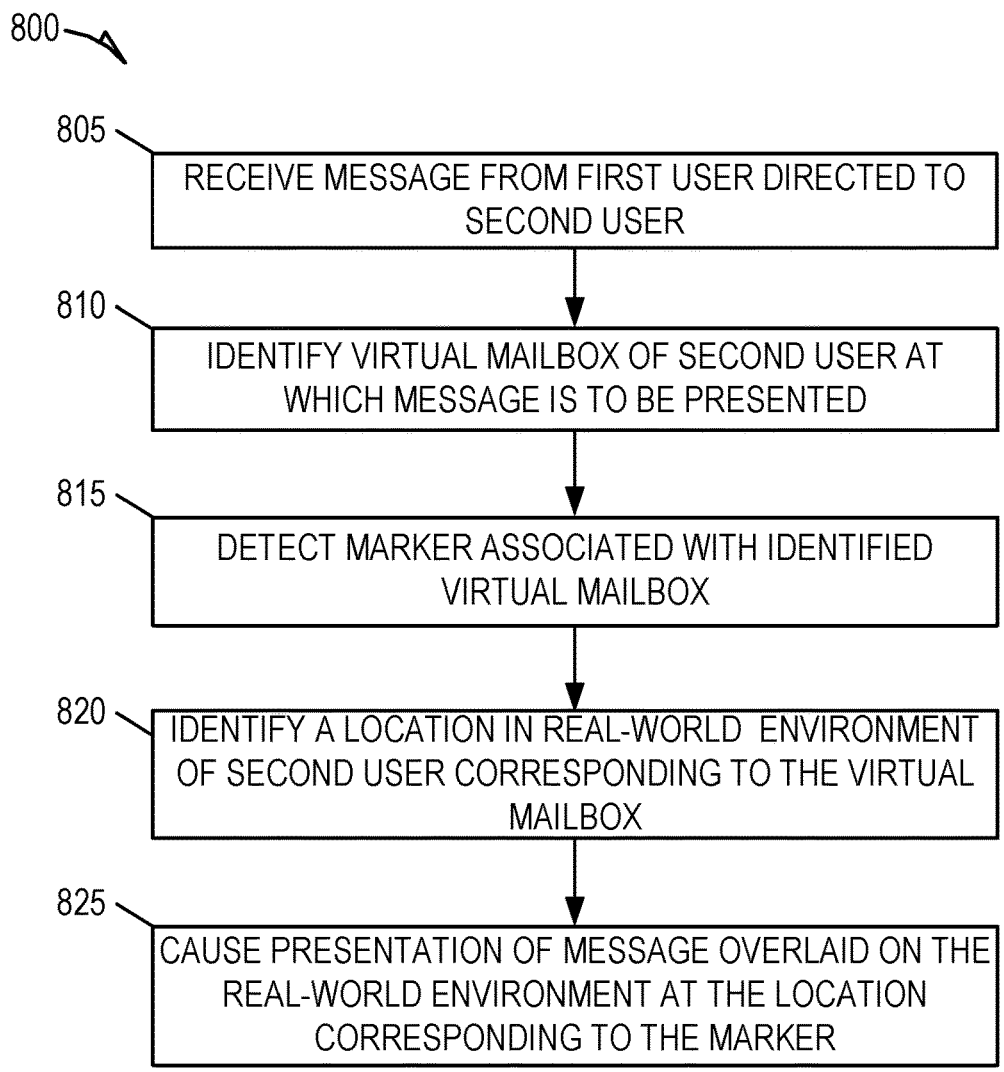
FIGS. 8 and 9 are flowcharts illustrating operations of the communication system in performing a method for handling in-bound messages using a virtual mailbox, according to example embodiments.

FIGS. 8 and 9 are flowcharts illustrating operations of the communication system in performing a method 800 for handling in-bound messages using a virtual mailbox, according to example embodiments. The method 600 may be embodied in computer-readable instructions for execution by one or more processors such that the operations of the method 600 may be performed in part or in whole by the functional components of the communication system 100; accordingly, the method 600 is described below by way of example with reference thereto. However, it shall be appreciated that at least some of the operations of the method 600 may be deployed on various other hardware configurations than the communication system 100.

At operation 805, the communication system 100 receives, from a first device (e.g., client device 102-1) of a first user (e.g., user 103-1), a message that is directed to a second user (e.g., the user 103-2). The message includes virtual content comprising one or more AR content items (e.g., pictures, texts, logos, animations, and sound effects).

At operation 810, the communication system 100 identifies a virtual mailbox of the second user at which the message is to be presented. The communication system 100 can identify the virtual mailbox from a set of virtual mailboxes of the second user. The communication system 100 can identify the virtual mailbox, for example, based on an identifier of the first user or a subject matter or substance of the message. In some instances, the communication system 100 can identify the virtual mailbox based on a designation of the virtual mailbox as an in-bound mailbox.

At operation 815, the communication system 100 detects a marker associated with the virtual mailbox. The marker can be a visual marker or a non-visual marker such as a time, a location, a particular noise, a noise level, a weather event, a temperature, or other signals that can be sensed by a computing device. Accordingly, the detecting of the marker can, for example, include detecting a visual marker in the real-world environment, detecting a particular time, determining the second user is within a predefined distance of the location, detecting a particular noise or noise level, detecting a weather event, or detecting a temperature. In instances in which the marker is a visual marker, the communication system 100 can perform image analysis to identify the visual marker in image data generated by a second device (e.g., client device 102-2) that includes one or more images of the real-world environment of the second user. In instances in which the marker is a non-visual marker, the marker can be detected based on sensor data generated by the second device along with other contextual data from the second device and/or external sources.

Based on detecting the marker, the communication system 100, at operation 820, identifies a location in a real-world environment of the second user corresponding to the virtual mailbox. The communication system 100 can identify the location based on a location at which the marker is detected or a location of the second user when the marker is detected (e.g., determined from location data provided by the second device).

At operation 825, the communication system 100 causes the second device to present the message overlaid on the real-world location of the second user at the location corresponding to the virtual mailbox. The communication system 100 may maintain message definition data that defines the presentation of the virtual content of message (e.g., the one or more AR content items) and in causing presentation of the message, the communication system 100 may provide the second device with the message definition data along with a set of instructions that causes the second device to display the virtual content overlaid on the real-world environment in accordance with the message definition data in real-time.

In some embodiments, the second device is a wearable device worn by the second user that includes optical elements that include a transparent display device. Consistent with these embodiments, the communication system 100 causes the transparent display device to display the message while allowing the second user to continue to view the real-world environment through the device. In this manner, the virtual content of the message is presented by the transparent display device overlaid on the real-world environment. However, it shall be appreciated that such information may in the alternative or in addition be presented by a primary device that is coupled to a wearable device. That is, depending on the embodiment, the wearable device of the second user can be a stand-alone device that is capable of independent operation or may be a companion device that works with a primary device to offload intensive processing.

As shown in FIG. 9, the method 800 can further include operations 905, 910, 915, and 920. At operation 905, the communication system 100 causes presentation, by the second device, of a visual representation of the virtual mailbox overlaid on the real-world environment of the second user at the location corresponding to the virtual mailbox. The visual representation may be specified in the virtual mailbox definition or may correspond to a default representation for virtual mailboxes.

At operation 910, the communication system 100 causes presentation, by the second device, of an indication of a message being received at the location in the real-world environment. The indication can be a visual indication or an auditory indication. In instances in which the indication is a visual indication, the communication system 100 can cause presentation of visual content overlaid on the real-world environment at the location of the virtual mailbox. In some instances, the visual content is presented in conjunction with the visual representation of the virtual mailbox. In some instances, the communication system 100 can cause presentation of the indication by changing or augmenting the visual representation of the virtual mailbox. For example, the visual representation of the virtual mailbox can be augmented with additional virtual content or through the addition of an animation involving one or more elements of the visual representation of the virtual mailbox and/or elements of additional virtual content.

At operation 915, the communication system 100 causes presentation, by the second device, of a preview of the message overlaid on the real-world environment at the location corresponding to the virtual mailbox. The preview can, for example, include a portion of the visual content that makes up the message or an indication of a number of messages that have been received. For example, the number "3" can be presented to indicate 3 messages have been received.

At operation 920, the application server causes presentation, by the second device, of a virtual mailbox feed. The virtual mailbox message feed comprises a list of messages received at the virtual mailbox from other users. The virtual mailbox feed can be presented as an overlay on the real-world environment or as part of a two-dimensional user interface. The second user can interact with the virtual mailbox feed to select messages to view or preview. For example, consistent with some embodiments, the message can be presented to the second user at operation 825 in response to receiving input indicative of the second user's selection of the message from the virtual mailbox message feed.

Figure 10:
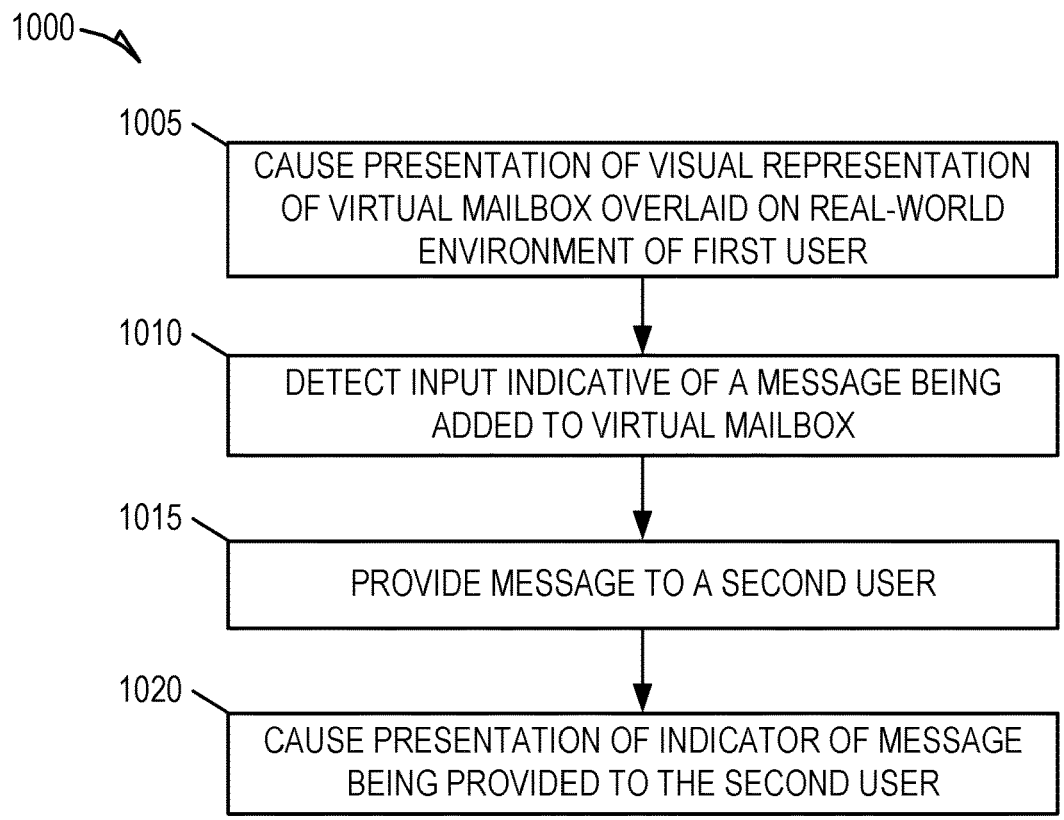
FIG. 10 are flowcharts illustrating operations of the communication system in performing a method for handling out-bound messages using a virtual mailbox, according to example embodiments.

The virtual content described herein (e.g., a virtual representation of the mailbox, a message, an indication of a message being received, a preview of a message, and a virtual mailbox feed) can be displayed in multiple modes of presentation including, for example, a transient mode where the content appears and fades away), a persistent mode where the content is present until expiration, and, a shared AR mode where the content is visible and can be interacted by all parties FIG. 10 are flowcharts illustrating operations of the communication system in performing a method 1000 for handling out-bound messages using a virtual mailbox, according to example embodiments.

At operation 1005, the communication system 100 causes presentation, by a first device (e.g., the client device 102-2) of a first user (e.g., the user 103-2), of a visual representation of a virtual mailbox overlaid on a real-world environment of the first user. In some embodiments, the visual representation of the virtual mailbox is presented based on detecting a marker associated with the virtual mailbox in the real-world environment. The marker can be used to determine a location at which the virtual mailbox is rendered within the real-world environment. The visual representation may be specified in a virtual mailbox definition or may correspond to a default representation for virtual mailboxes.

At operation 1010, the communication system 100 detects input indicative of a message being added to the virtual mailbox by the first user. The message can comprise virtual content such as one or more AR content items. The input can, for example, correspond to a hand gesture performed by the first user. For example, the first user can drag the message from a drafting interface and drop the message at the location of the visual representation of the mailbox.

At operation 1015, the communication system 100 provides the message to a second user based on the message being added to the virtual mailbox by the first user. In providing the second user with the message, the communication system 100 can cause a second device associated with the second user to present the message overlaid on a real-world environment of the second user.

At operation 1020, the communication system 100 causes presentation, by the first device, of an indication of the message being provided to the second user. The indication can be a visual indication or an auditory indication. In instances in which the indication is a visual indication, the communication system 100 can cause presentation of visual content overlaid on the real-world environment at the location of the virtual mailbox. In some instances, the visual content is presented in conjunction with the visual representation of the virtual mailbox. In some instances, the communication system 100 can cause presentation of the indication by changing or augmenting the visual representation of the virtual mailbox.

Software Architecture

Figure 11:
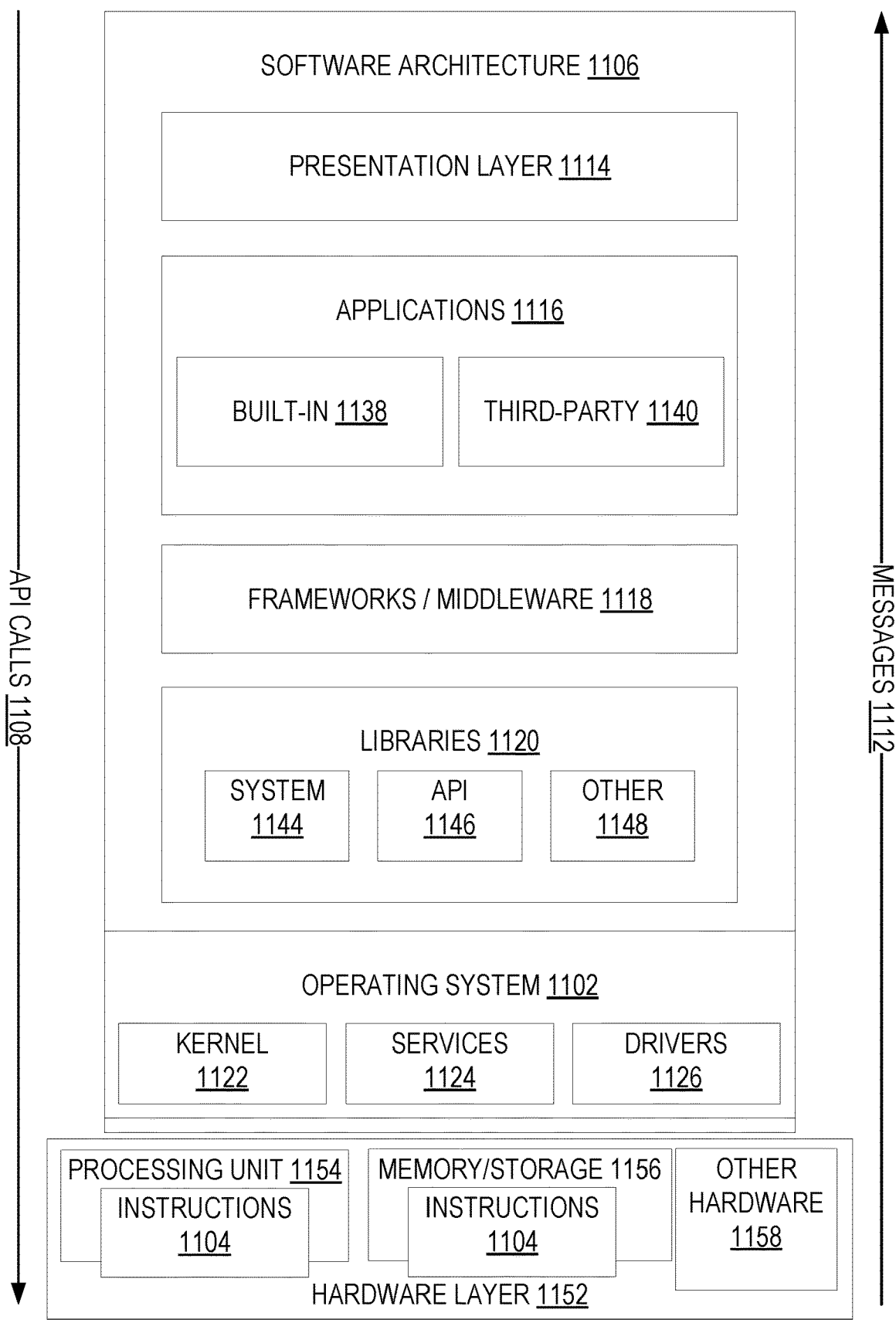
FIG. 11 is a block diagram illustrating a representative software architecture, which may be used in conjunction with various hardware architectures herein described, according to example embodiments.

FIG. 11 is a block diagram illustrating an example software architecture 1106, which may be used in conjunction with various hardware architectures herein described. FIG. 11 is a non-limiting example of a software architecture, and it will be appreciated that many other architectures may be implemented to facilitate the functionality described herein. The software architecture 1106 may execute on hardware such as a machine 1200 of FIG. 12 that includes, among other things, processors 1204, memory/storage 1206, and I/O components 1218. A representative hardware layer 1152 is illustrated and can represent, for example, the machine 1200 of FIG. 12. The representative hardware layer 1152 includes a processing unit 1154 having associated executable instructions 1104. The executable instructions 1104 represent the executable instructions of the software architecture 1106, including implementation of the methods, components, and so forth described herein. The hardware layer 1152 also includes memory and/or storage modules 1156, which also have the executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive a response to the API calls 1108 as messages 1112. The layers illustrated are representative in nature and not all software architectures have all layers. For example, some mobile or special-purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than by interfacing directly with the underlying operating system 1102 functionality (e.g., kernel 1122, services 1124, and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 provide a higher-level common infrastructure that may be used by the applications 1116 and/or other software components/modules. For example, the frameworks/middleware 1118 may provide various GUI functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. The third-party applications 1140 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 1140 may invoke the API calls 1108 provided by the mobile operating system (such as the operating system 1102) to facilitate functionality described herein.

The applications 1116 may use built-in operating system functions (e.g., kernel 1122, services 1124, and/or drivers 1126), libraries 1120, and frameworks/middleware 1118 to create user interfaces to interact with users of the system. Alternatively, or additionally, in some systems interactions with a user may occur through a presentation layer, such as the presentation layer 1114. In these systems, the application/component "logic" can be separated from the aspects of the application/component that interact with a user.

Figure 12:
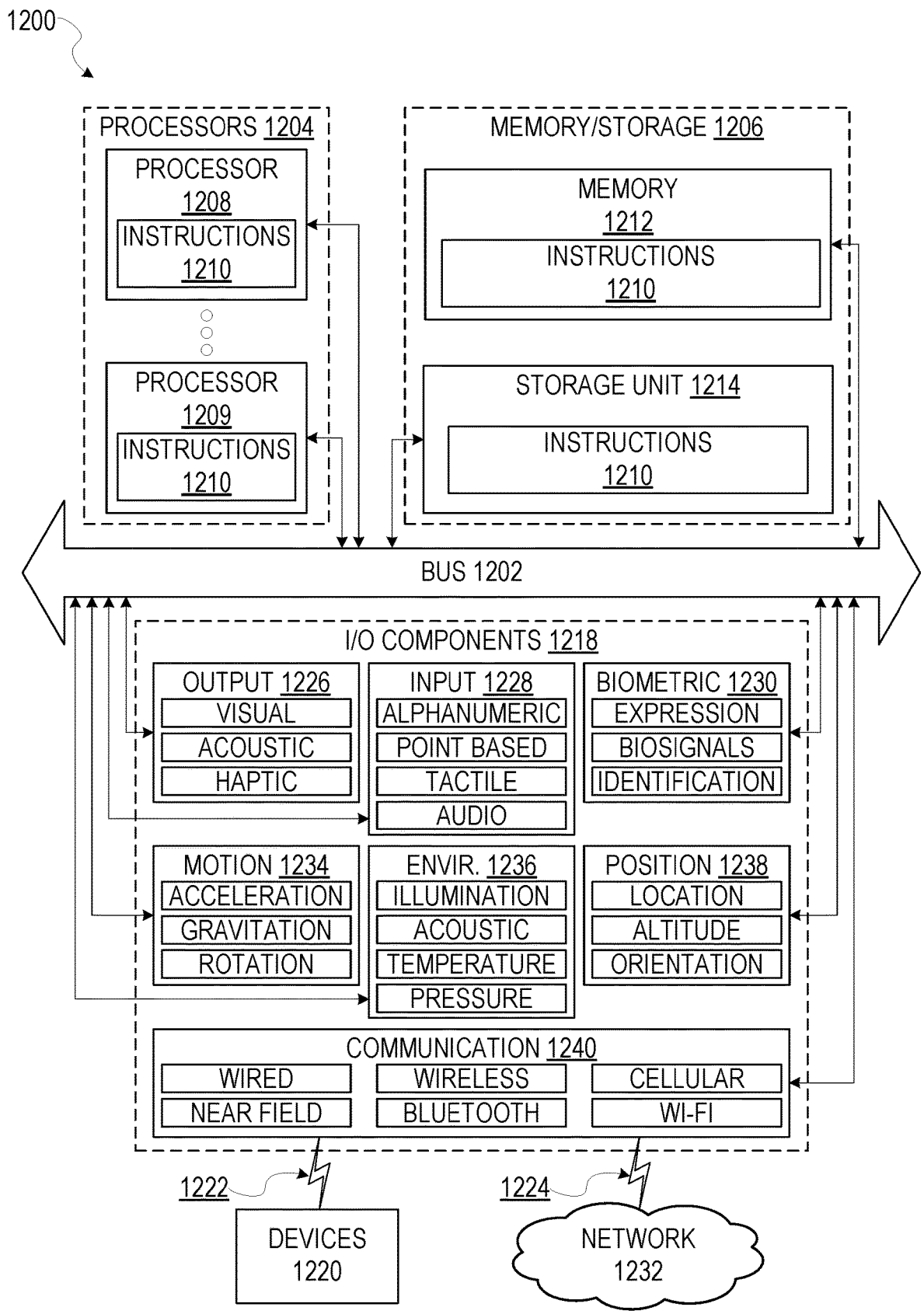
FIG. 12 is a block diagram illustrating components of a machine able to read instructions from a machine-readable medium (e.g., a machine-readable storage medium) and perform any one or more of the methodologies discussed herein, according to example embodiments.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. In an example embodiment, the processors 1204 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 1208 and a processor 1209 that may execute the instructions 1210. Although FIG. 12 shows multiple processors 1204, the machine 1200 may include a single processor with a single core, a single processor with multiple cores (e.g., a multi-core processor), multiple processors with a single core, multiple processors with multiple cores, or any combination thereof.

The memory/storage 1206 may include a memory 1212, such as a main memory, or other memory storage, and a storage unit 1214, both accessible to the processors 1204 such as via the bus 1202. The storage unit 1214 and memory 1212 store the instructions 1210 embodying any one or more of the methodologies or functions described herein. The instructions 1210 may also reside, completely or partially, within the memory 1212, within the storage unit 1214, within at least one of the processors 1204 (e.g., within the processor's cache memory), or any suitable combination thereof, during execution thereof by the machine 1200. Accordingly, the memory 1212, the storage unit 1214, and the memory of the processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion, and the grouping is in no way limiting. In various example embodiments, the I/O components 1218 may include output components 1226 and input components 1228. The output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1218 may include biometric components 1230, motion components 1234, environment components 1236, or position components 1238, among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1238 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via a coupling 1224 and a coupling 1222, respectively. For example, the communication components 1240 may include a network interface component or other suitable device to interface with the network 1232. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A method comprising:
    establishing a virtual mailbox for a first user to receive messages based on a virtual mailbox definition specified by the first user, the virtual mailbox definition comprising a designation of the virtual mailbox as an in-bound mailbox;
    receiving, from a first device associated with a second user, a message directed to the first user;
    identifying a location within a real-world environment of the first user corresponding to the virtual mailbox definition;
    detecting a marker associated with the virtual mailbox within the real-world environment of the first user; and
    based on detecting the marker, causing presentation, at a second device associated with the first user, of the message overlaid on the real-world environment at the location corresponding to the virtual mailbox.

2. The method of claim 1, further comprising:
    providing, to the second device, a user interface to define the virtual mailbox; and
    receiving, from the second device, the virtual mailbox definition generated based on input received from the first user via the user interface.

3. The method of claim 2, further comprising:
    receiving, from the second device, additional input indicative of an update to the virtual mailbox definition; and
    updating the virtual mailbox based on the update to the virtual mailbox definition.

4. The method of claim 3, wherein updating the virtual mailbox comprises one or more of:
    changing the location corresponding to the virtual mailbox;
    changing a visual representation of the virtual mailbox; and changing one or more constraints on messages received at the virtual mailbox.

5. The method of claim 1, wherein the virtual mailbox definition specifies one or more of: the location corresponding to the virtual mailbox, a visual representation of the virtual mailbox, the marker associated with the virtual mailbox, and one or more constraints on messages received at the virtual mailbox.

6. The method of claim 1, further comprising:
identifying the virtual mailbox from a set of virtual mailboxes of the first user.

7. The method of claim 1, further comprising:
causing presentation, by the second device, of a visual representation of the virtual mailbox overlaid on the real-world environment of the first user.

8. The method of claim 1, further comprising:
causing presentation, by the second device, of an indication of the message being received at the location, the presentation of the indication being overlaid on the real-world environment of the first user.

9. The method of claim 8, wherein causing presentation, by the second device, of the indication of the message being received comprises one of:
changing a visual representation of the virtual mailbox;
causing presentation of a virtual object at the location; and
causing presentation of an animation associated with the visual representation of the virtual mailbox.

10. The method of claim 1, further comprising:
causing presentation, by the second device, of a preview of the message overlaid on the real-world environment of the first user at the location corresponding to the virtual mailbox.

11. The method of claim 1, further comprising:
causing presentation, by the second device, of a message feed overlaid on the real-world environment of the first user at the location corresponding to the virtual mailbox, the message feed displaying a plurality of messages including the message received from the first device of the second user.

12. The method of claim 1, wherein:
the message is a first message;
the virtual mailbox definition further comprises a designation of the virtual mailbox as an out-bound mailbox; and
the method further comprises:
detecting input indicative of a second message being added to the virtual mailbox; and
based on the second message being added to the virtual mailbox, providing the second message to the first user.

13. The method of claim 12, further comprising:
causing presentation, by the second device, of an indication of the second message being provided to the first user.

14. The method of claim 1, wherein:
the second device is a wearable device worn by the first user;
the wearable device comprises a transparent display; and
causing the second device to present the message overlaid on the real-world environment comprises causing the transparent display to present the message.

15. The method of claim 1, wherein detecting of the marker comprises performing image analysis to identify a visual marker within the real-world environment of the first user.

16. The method of claim 1, wherein detecting of the marker is based on sensor data generated by the second device.

17. A system comprising:
one or more hardware processors; and
at least one memory storing instructions that cause the one or more hardware processors to perform operations comprising:
establishing a virtual mailbox for a first user to receive messages based on a virtual mailbox definition specified by the first user, the virtual mailbox definition comprising a designation of the virtual mailbox as an in-bound mailbox;
receiving, from a first device associated with a second user, a message directed to the first user;
identifying a location within a real-world environment of the first user corresponding to the virtual mailbox;
detecting a marker associated with the virtual mailbox within the real-world environment of the first user; and
based on detecting the marker, causing presentation, at a second device associated with the first user, of the message overlaid on the real-world environment at the location corresponding to the virtual mailbox.

18. The system of claim 17, wherein the operations further comprise:
providing, to the second device, a user interface to define the virtual mailbox; and
receiving, from the second device, the virtual mailbox definition generated based on input received from the first user via the user interface.

19. The system of claim 17, wherein the operations further comprise:
causing presentation, by the second device, of one or more of:
a visual representation of the virtual mailbox overlaid on the real-world environment of the first user;
an indication of the message being received at the location, the presentation of the indication being overlaid on the real-world environment of the first user;
a preview of the message overlaid on the real-world environment of the first user at the location corresponding to the virtual mailbox; and
a message feed overlaid on the real-world environment of the first user at the location corresponding to the virtual mailbox, the message feed displaying a plurality of messages including the message received from the first device of the second user.

20. A machine-readable medium storing instructions that, when executed by a computer system, cause the computer system to perform operations comprising:
establishing a virtual mailbox for a first user to receive messages based on a virtual mailbox definition specified by the first user, the virtual mailbox definition comprising a designation of the virtual mailbox as an in-bound mailbox;
receiving, from a first device associated with a second user, a message directed to the first user;
identifying a location within a real-world environment of the first user corresponding to the virtual mailbox;
detecting a marker associated with the virtual mailbox within the real-world environment of the first user; and
based on detecting the marker, causing presentation, at a second device associated with the first user, of the message overlaid on the real-world environment at the location corresponding to the virtual mailbox.

* * * * *